United States Patent

[11] 3,604,688

| [72] | Inventor | Dorland H. Schuler<br>Griswold, Iowa 51535 |
|---|---|---|
| [21] | Appl. No. | 2,300 |
| [22] | Filed | Jan. 12, 1970 |
| [45] | Patented | Sept. 14, 1971 |

[54] MIXING AND FEEDING WAGON
9 Claims, 4 Drawing Figs.

[52] U.S. Cl............................................. 259/6,
259/97, 259/31, 214/519
[51] Int. Cl............................................. B01f 7/08
[50] Field of Search............................................. 259/7, 41,
97, DIG. 31, 6, 42, 45, 49, 9, 10, 5; 214/83.32, 519

[56] References Cited
UNITED STATES PATENTS

| 3,345,042 | 10/1967 | Ryan | 259/7 |
|---|---|---|---|
| 2,953,360 | 9/1960 | Kline | 259/97 |
| 3,168,291 | 2/1965 | Knoedler | 259/9 |
| 3,273,734 | 9/1966 | Schuler | 259/97 |
| 3,379,417 | 4/1968 | Luscombe | 259/6 |

Primary Examiner—Robert W. Jenkins
Attorney—Zarley, McKee & Thomte

ABSTRACT: A mixing and feeding wagon comprising a wagon box having a drag chain means movably mounted therein which conveys feed forwardly to a reversible auger conveyor extending across the upper forward end of the wagon box. The reversible auger conveyor will discharge feed from one end thereof at one side of the box when operated in one direction for feeding purposes and will convey feed towards the other end to the forward end of a longitudinal auger conveyor when operated in a reverse direction for mixing purposes. The longitudinal auger conveyor conveys the feed rearwardly along the exterior of the wagon box to a diagonal auger conveyor which extends upwardly into the wagon box at the rearward end thereof. The diagonal auger conveyor has open flighting provided thereon which has decreasing diameter from its lower to upper ends. The reversible auger conveyor is operated in an opposite direction simultaneously with the drag chain means, longitudinal auger conveyor and diagonal auger conveyor to mix the feed in the wagon.

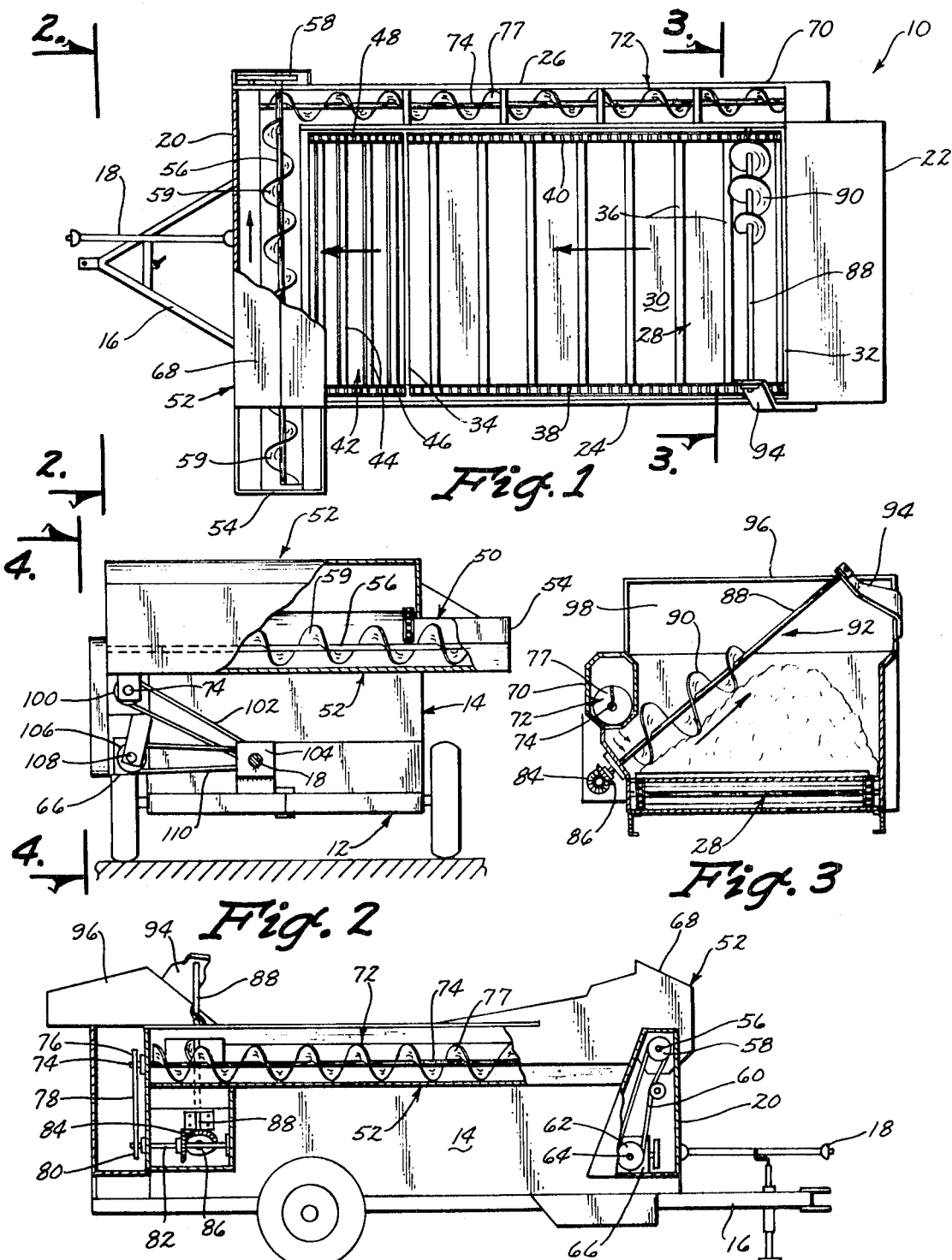

MIXING AND FEEDING WAGON

Conventional feeder wagons or bunk wagons are merely designed to discharge feed into a bunk feeder or the like and have no means for mixing the feed therein. In other words, the feed must be mixed prior to being placed in the wagon box. Some feeder wagon manufacturers have provided a mixing attachment to the feeder wagons but the resulting wagon has an extremely high silhouette which makes it difficult if not impossible to place feed therein from a silo or the like. Further, the modified wagons also require an extremely large amount of power to operate since the entire load in the wagon is moved at once. Additionally, an unsatisfactory mixing of the feed also occurs.

Therefore, it is a principal object of this invention to provide a wagon box which may be used for mixing and feeding feed material.

A further object of this invention is to provide a mixing and feeding wagon having a low silhouette.

A further object of this invention is to provide a mixing and feeding wagon which requires approximately one-third the horsepower of other wagons.

A further object of this invention is to provide a mixing and feeding wagon which satisfactorily and efficiently mixes the feed therein.

A further object of this invention is to provide a mixing and feeding wagon which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a top view of the wagon box of this invention with portions thereof cut away to more fully illustrate the invention;

FIG. 2 is a front view of the wagon box with portions thereof cut away to more fully illustrate the invention;

FIG. 3 is a sectional view as seen along lines 3—3 of FIG. 1; and

FIG. 4 is a side view of the wagon as seen along line 4—4 of FIG. 2 with portions thereof cut away to more fully illustrate the invention.

The wagon of this invention is generally designated by the reference numeral 10 and includes a wheeled frame means 12 having a wagon box 14 mounted thereon. The wheeled frame means 12 has a forwardly extending hitch 16 to permit the wagon to be pulled behind a prime mover or the like. The numeral 18 refers generally to a drive shaft which is adapted to be connected to the prime mover power-takeoff assembly.

For purposes of description, the wagon 10 will be described as having a forward end 20, a rearward end 22, and opposite sides 24 and 26.

The numeral 28 refers generally to a drag chain means which is movably mounted at the bottom 30 of the wagon 10 and is adapted to convey feed material in the wagon forwardly from its rearward end 22 to its forward end 20. Drag chain means 28 is horizontally disposed and consists generally of a plurality of slats 36 which are secured to and extend between the chains 38 and 40. Chains 38 and 40 are suitably mounted on sprockets which are mounted on conventional rotatable shafts. The numeral 42 generally refers to a drag chain means extending upwardly and forwardly from the forward end of the drag chain means 28 and consists generally of a plurality of slats 44 secured to and extending between chains 46 and 48 suitably mounted on sprockets and shafts.

A reversible auger conveyor 50 is rotatably mounted in a transversely extending trough generally designated by the reference numeral 52. Trough 52 has a discharge end 54 which is positioned outwardly of side 24 to permit feed to be discharged therefrom into feed bunks or the like. Auger conveyor means 50 comprises a shaft 56 having flighting 59 mounted thereon as illustrated in FIG. 2. One end of shaft 56 has a sprocket 58 mounted thereon for rotation therewith as illustrated in FIG. 4. Chain 60 extends from around sprocket 58 and around sprocket 62 mounted on shaft 64. Shaft 64 extends from a gear box generally referred to by the reference numeral 66 which permits the direction of rotation of shaft 56 to be reversed as desired. Gearbox 66 is operatively connected to the drive shaft 18. Trough 52 has a hood 68 extending thereover as illustrated in FIGS. 1 and 2. The drag chains 28 and 42 are adapted to convey feed in the box 14 into the trough 52 as will be more fully explained hereinafter.

Trough 52 communicates at its end which is opposite to discharge end 54 with a longitudinally extending conveyor housing 70 having an auger conveyor means 72 rotatably mounted therein adapted to convey feed rearwardly from its forward end. Auger conveyor 72 comprises generally a shaft 74 having spiral flighting 77 mounted thereon. The rearward end of shaft 74 has a sprocket 76 mounted thereon around which extends a chain 78. Chain 78 extends around a sprocket 80 mounted on shaft 82. Shaft 82 has a bevel gear means 84 mounted thereon which is in mesh with a bevel gear 86 which is secured to the lower end of shaft 88. Shaft 88 extends upwardly and inwardly into the interior of the box 14 at a 45° angle and has spiral flighting 90 mounted thereon. As seen in FIG. 3, the spiral flighting 90 has a diameter which tapers or decreases in thickness from its lower end to its upper end. The rearward end of housing 70 is open at its lower end to permit the material being conveyed rearwardly therein to communicate with the lower end of the diagonal auger conveyor 92 comprised of the shaft 88 and flighting 90. As seen in FIG. 3, the upper end of shaft 88 is journaled in a support 94. A hood 96 extends over the upper rearward end of the box to provide a mixing chamber 98 to retain silage or feed that boils up from the diagonal auger conveyor. The forward end of shaft 74 has a sprocket 100 mounted thereon having a chain 102 in engagement therewith. Chain 102 is operatively connected to a gearbox 104 to which is connected the drive shaft 18. As seen in FIG. 2, gearbox 66 has a sprocket 106 mounted on a shaft 108 which extends therefrom over which extends the chain 110 to connect the same to the gearbox 104. The gearbox 66 includes means to reverse the direction of rotation of shaft 64.

In operation, the feed materials to be mixed are placed in the box 14 and the low silhouette of the box 14 permits the same to be filled by means of overhead silos or the like. The feed ingredients are mixed by supplying power through shaft 18 to the gearbox 104 and gearbox 66. The drag chains 28 and 42 are operated simultaneously with auger conveyor 50, auger conveyor 72 and auger conveyor 92. The auger conveyor 50 is operated in a direction corresponding to the arrow in FIG. 1 so that the feed material fed thereto will be conveyed to the forward end of the auger conveyor 72 rather than being discharged from the discharge end 54 thereof. The feed material supplied to the forward end of auger conveyor 72 by the auger conveyor 50 is conveyed rearwardly to the lower end of the diagonal conveyor 92 which conveys the same upwardly and inwardly into the interior of the box as illustrated in FIG. 3. The diagonal auger conveyor brings material which has previously been on the bottom of the box to the top portion of the load and the tapered flighting thereon peaks the load in the rear central portion of the box. If the flighting 90 is not tapered, it has been found that excessive throwing of the feed material will occur thereby causing an uneven peaking of the load. The novel arrangement of the various auger conveyors in the box results in a low silhouette and also results in an extremely efficient feed mixing operation. During the feed mixing operation, approximately only one-third of the load is moved at a time thereby resulting in a power requirement of approximately one-third of the other wagons since they move the entire load at once.

After the feed has been thoroughly mixed in the wagon, the auger conveyors 72 and 92 are deactivated and the direction of rotation of the auger conveyor 50 is reversed so that material supplied thereto will be discharged from the discharge end 54.

Thus it can be seen that an extremely efficient and convenient wagon has been provided which permits the feed to be mixed and discharged therefrom while still maintaining the low silhouette requirements. Thus it can be seen that the device accomplishes at least all of its stated objectives.

I claim:
1. A mixing and feeding wagon comprising:
a wagon box having rearward and forward ends and opposite sides;
a drag chain means movably mounted in said box and adapted to drag material forwardly in said box;
a horizontally disposed first conveyor means at said forward end of said box adapted to receive material from said drag chain means and having opposite ends, a material discharge means at one end of said first conveyor means, said first conveyor means being reversible whereby the material will be conveyed to said discharge means hen said first conveyor means is moved in one direction and whereby said first conveyor means will convey the material towards its other end when said first conveyor means is moved in an opposite direction;
a side conveyor means at one side of said box having its forward end communicating with the other end of said first conveyor means and its rearward end positioned adjacent said rearward end of said box;
a second conveyor means having one end adjacent the lower portion of said rearward end of said box and its other end communicating with the interior of said box, said one end being in communication with said rearward end of said side conveyor means for receiving material therefrom;
power means powering said conveyor means; and
control means for selectively powering said conveyor means.

2. The wagon of claim 1 wherein said drag chain means has its forward end elevated above its rearward end, said first conveyor means being an auger means positioned at the forward end of said drag chain means and being in a plane above the rearward end of said drag chain means.

3. The wagon of claim 2 wherein said side conveyor means comprises a horizontally disposed auger means positioned outwardly of said box.

4. The wagon of claim 3 wherein said second conveyor means comprises a diagonally extending auger means extending upwardly and away from the rearward end of said side conveyor means.

5. The wagon of claim 4 wherein said diagonally extending auger means is disposed at a 45° angle with respect to the rearward end of said drag chain means.

6. The wagon of claim 5 wherein said diagonally extending auger means comprises flighting mounted on a central shaft, said spiral flighting decreasingly tapering in diameter from its lower end to its upper end.

7. The wagon of claim 1 herein said control means includes means for reversing the direction of said first conveyor means and wherein said control means includes means for deactivating said side conveyor means and said second conveyor means when said first conveyor means is conveying material towards said material discharge means.

8. The wagon of claim 1 wherein said drag chain means comprises a horizontally disposed chain portion and an inclined chain portion extending upwardly and forwardly from the forward end of the horizontally disposed chain portion.

9. The wagon of claim 1 wherein a hood means is positioned over the upper rearward end of the box above said second conveyor means to provide a mixing chamber.